US012062994B2

(12) United States Patent
Maier et al.

(10) Patent No.: US 12,062,994 B2
(45) Date of Patent: Aug. 13, 2024

(54) CIRCUIT ARRANGEMENT WITH ACTIVE RECTIFIER CIRCUIT AND ITS APPLICATION IN A SYNCHRONOUS MACHINE

(71) Applicant: UNIVERSITÄT STUTTGART, Stuttgart (DE)

(72) Inventors: David Maier, Buehl (DE); Marco Zimmer, Ulm (DE); Nejila Parspour, Gerlingen (DE)

(73) Assignee: UNIVERSITÄT STUTTGART, Stuttgart (DE)

( * ) Notice: Subject to any disclaimer, the term of this patent is extended or adjusted under 35 U.S.C. 154(b) by 432 days.

(21) Appl. No.: 17/381,443

(22) Filed: Jul. 21, 2021

(65) Prior Publication Data
US 2022/0029553 A1 Jan. 27, 2022

(30) Foreign Application Priority Data
Jul. 24, 2020 (DE) ...................... 10 2020 119 598.2

(51) Int. Cl.
*H02P 6/15* (2016.01)
*H02J 50/10* (2016.01)
(Continued)

(52) U.S. Cl.
CPC ............. *H02M 7/217* (2013.01); *H02J 50/10* (2016.02); *H02P 25/022* (2013.01)

(58) Field of Classification Search
CPC ................................... H02P 25/26; H02P 3/24
See application file for complete search history.

(56) References Cited

U.S. PATENT DOCUMENTS

| 5,907,481 A | 5/1999 | Svärdsjö | |
|---|---|---|---|
| 2012/0256422 A1* | 10/2012 | Fradella | H02K 3/47 290/55 |

(Continued)

FOREIGN PATENT DOCUMENTS

| CN | 110199465 A | 9/2019 |
|---|---|---|
| DE | 10001876 C1 | 4/2001 |

(Continued)

OTHER PUBLICATIONS

David Maier, Jorg Heinrich, Mike Bottigheimer, Nejila Parspour, "A Novel Contactless Capacitive Energy and Data Transfer System" (Year: 2021).*

(Continued)

*Primary Examiner* — Kawing Chan
*Assistant Examiner* — Charles S Laughlin
(74) *Attorney, Agent, or Firm* — Renner, Kenner, Greive, Taylor & Weber

(57) ABSTRACT

The present invention relates to a circuit arrangement having an active rectifier circuit, in particular on a secondary side of an inductive energy transmission path. The circuit arrangement has a half or full bridge of power transistors for rectifying an AC voltage induced in an input inductor of the circuit arrangement. The power transistors are connected to the input inductor in such a way that an auxiliary voltage is split off from the induced AC voltage for switching the power transistors. As a result, even large currents, which result in a low output voltage, can be transmitted without endangering the operation of the rectifier circuit.

14 Claims, 3 Drawing Sheets

(51) Int. Cl.
*H02M 7/217* (2006.01)
*H02P 9/12* (2006.01)
*H02P 25/022* (2016.01)

(56) References Cited

U.S. PATENT DOCUMENTS

2014/0265744 A1* 9/2014 Rozman .................... H02P 9/30
310/68 D
2017/0316863 A1* 11/2017 Francis ................... H01F 27/28

FOREIGN PATENT DOCUMENTS

DE 60003003 T2 4/2004
DE 202007011745 U1 1/2008

OTHER PUBLICATIONS

J. Heinrich et al., "Efficiency Factor Calculation for Contactless Energy Transfer Systems," IEEE Wireless Power Transfer Conference (2019), pp. 130-135.
D. Maier et al., "A Novel Contactless Capacitive Energy and Data Transfer System," IEEE (2018), 4 pages.
Dissertation of E. M. Illiano, "Design of a highly efficient brushless current excited synchronous motor for automotive purposes," ETH Zurich, No. 22393 (2014).
English Translation of DE Examination Report for 10 2020 119 598.2, Dec. 12, 2020, (3 pages).

* cited by examiner

CIRCUIT ARRANGEMENT WITH ACTIVE RECTIFIER CIRCUIT AND ITS APPLICATION IN A SYNCHRONOUS MACHINE

TECHNICAL FIELD OF APPLICATION

The present invention relates to a circuit arrangement having an active rectifier circuit, in particular for use on the secondary side of an inductive energy transmission path, with a half or full bridge of power transistors for rectifying an AC voltage induced in an input inductor of the circuit arrangement. The invention also relates to the use of such a circuit arrangement in an electrically excited synchronous machine.

Contactless inductive energy transmission systems are now used in numerous applications. The energy provided in a primary circuit is transmitted inductively via at least one primary coil to at least one secondary coil in a secondary circuit. The AC voltage induced at the secondary coil can then be converted into a DC voltage by means of a rectifier circuit. This technology can also be used in an electrically excited synchronous machine for the energy transmission between stator and rotor. This is advantageous compared to energy transmission by means of slip rings, particularly if a higher current can be transmitted to the rotating shaft in a smaller installation space by means of the inductive energy transmission. For a higher current, a classic slip ring requires a larger contact surface of the slip ring on the shaft and thus a larger axial installation space in order not to exceed the permissible current density of the slip ring contact. Furthermore, the mechanical wear is very high. An inductive energy transmission system, on the other hand, can provide a current of almost any level on the rotating shaft by varying the winding ratio between the primary and secondary coils, independent of the installation space, and shows no mechanical wear.

When designing rotors of electrically excited synchronous machines, it is advantageous to use a lower number of turns with a correspondingly higher current. Since each individual winding in the rotor is insulated with magnet wire, the copper fill factor in the rotor increases with a decreasing number of turns, as the amount of enamel decreases in total. In a given installation space, a greater magnetic field can therefore be generated at a higher fill factor. However, when performing a contactless inductive energy transmission of high currents, very low voltages occur on the secondary side, which are then no longer sufficiently high to supply an active rectifier circuit. For example, when using a simple winding with only a few turns on the rotor, the required rotor excitation for a motor with 150 kW is 1500 W, corresponding to 100 A and 15 V. In the partial load range, the rotor current is reduced, such that a voltage of only 7.5 V is applied at a current of 50 A. However, these low voltages are no longer sufficient for switching an active rectifier. The use of passive rectifiers is not an option in such an application due to the voltage loss across the diodes of the rectifier circuit, as the power dissipation is too high at these low output voltages. For example, a rotor current of 100 A on a conventional diode with 0.7 V forward voltage results in an unacceptable power dissipation of 70 W.

PRIOR ART

The dissertation, "Design of a highly efficient brushless current excited synchronous motor for automotive purposes", by E. M. Illiano, ETH Zurich, No. 22393, 2014, proposes to install an additional winding in the energy transmission system of the synchronous machine in order to generate a voltage sufficient to switch a circuit breaker or to quickly demagnetize the rotor. The introduction of an additional winding or a second energy transmission system is generally a way to provide an additional voltage, but also requires high additional costs.

An example of an active rectifier circuit is described in DE 202007011745 U1. This is a so-called Royer converter, which can be operated either as an active rectifier or as an inverter. The voltage for the gates of the MOSFET control transistors used in this Royer converter, and thus for switching the power transistors, is tapped at the DC link voltage by means of a Zener diode. However, it is not possible to use such an active rectifier circuit on the secondary side of an inductive energy transmission system when transmitting high currents, as the DC link voltage in the case of high currents is too low to reliably drive the control transistors.

The problem underlying the present invention is to specify a circuit arrangement with active rectifier circuit, which can be used on the secondary side of an inductive energy transmission path even when transmitting high currents, and which incurs low additional costs.

DESCRIPTION OF THE INVENTION

The problem is solved with the circuit arrangement according to claim 1. Advantageous embodiments of the circuit arrangement are the subject matter of the dependent claims or can be seen in the following description and the exemplary embodiments.

The proposed circuit arrangement with an active rectifier circuit has a half or full bridge of power transistors, preferably of MOSFET power transistors, in the known manner, for rectifying an AC voltage induced in an input inductor of the circuit arrangement. The circuit arrangement is characterized by the fact that the power transistors are connected to the input inductor in such a way that a voltage, here referred to as auxiliary voltage, is split off from the induced AC voltage for switching the power transistors. Herein, use is made of the fact that the voltage induced in the input inductor at its peak value is a multiple of the output voltage of the active rectifier. Since virtually no energy is required to switch the power transistors, this peak value can be used to control the switching process.

Thus, the proposed circuit arrangement can also be used on the secondary side of an inductive energy transmission path if very high currents are to be transmitted, at which currents the output or DC link voltage is no longer sufficient to switch the power transistors of the active rectifier. The proposed circuit arrangement does not require any additional coils but can be easily realised via a suitable tap of the induced AC voltage. In a preferred embodiment, the input inductor of the circuit arrangement is compensated with a capacitor in parallel, and the auxiliary voltage for switching the power transistors is split off from the resonant circuit formed by the parallel circuit of the input inductor and the capacitor.

The active rectifier circuit of the proposed circuit arrangement is preferably designed as a Royer converter. This preferred embodiment of the circuit arrangement has the input inductor, in particular in the form of one or multiple coils connected in series, with a first capacitor connected in parallel, which form a resonant circuit. A first power transistor of the active rectifier circuit is connected in such a way that it establishes a switchable electrical connection between a first side of the input inductor and a first pole of the output terminal of the rectifier circuit. A second power transistor accordingly establishes a switchable electrical connection between the second side of the input inductor and the first pole of the output terminal. Two control transistors, preferably MOSFET transistors, of the active rectifier circuit are used to drive the power transistors. For this purpose, the drain terminal of the first control transistor is connected to the drain terminal of the first power transistor and the source terminal of the first control transistor is connected to the gate terminal of the second power transistor. The drain terminal of the second control transistor is connected to the drain terminal of the second power transistor and the source terminal of the second control transistor is connected to the gate terminal of the first power transistor. A centre tap on the input inductor or both sides of the input inductor of the resonant circuit are connected to the second pole of the output terminal via respective chokes. This preferred circuit arrangement is characterized in that the gate terminals of the first and second control transistors are connected to at least one side of the input inductor of the resonant circuit via at least one resistor and one diode and are connected to the first pole of the output terminal via a parallel circuit of a second capacitor and a Zener diode. Preferably, these gate terminals of the first and second control transistors are each connected not only to one side, but to both sides of the input inductor of the resonant circuit via respective resistors and diodes, in order to obtain a circuit design that is as symmetrical as possible. The auxiliary voltage for driving the control transistors and thus switching the power transistors is provided via this connection to the resonant circuit.

In a refinement of this circuit arrangement, the gate terminals of the first and second power transistors are additionally connected to the first pole of the output terminal either via a series circuit of another Zener diode and another diode or via a bidirectional Zener diode. The additional Zener diode is connected in such a way that a current flowing from the gate terminal of the power transistor in question to the first pole of the output terminal is blocked until the Zener voltage is reached; the other diode is connected in the opposite direction. The additional Zener diode prevents an excessive voltage at the respective gates, as could be present under certain conditions. Furthermore, the additional diode prevents an undesired current flowing via the body diodes of the control transistors and the Zener diode, which could lead to the destruction of these components. A bidirectional Zener diode can also be used as an alternative to the series circuit of Zener diode and diode.

The proposed circuit arrangement can be used on a rotor of a synchronous machine, in which an inductive energy transmission to the rotor is to be performed via the input inductor of the circuit arrangement. In particular, the rotor can be designed with a low number of turns and correspondingly high copper fill factor, as the proposed circuit arrangement makes it possible to transmit and rectify high currents. The rotor winding is formed by one or multiple chokes of the proposed circuit arrangement. In principle, the proposed circuit arrangement can be used in all contactless, inductive energy transmission paths, and in particular is advantageous when high currents are to be transmitted.

SHORT DESCRIPTION OF THE DRAWINGS

The proposed circuit arrangement is explained in more detail below based on exemplary embodiments in conjunction with the drawings. In these:

WAYS TO IMPLEMENT THE INVENTION

Figure 1:
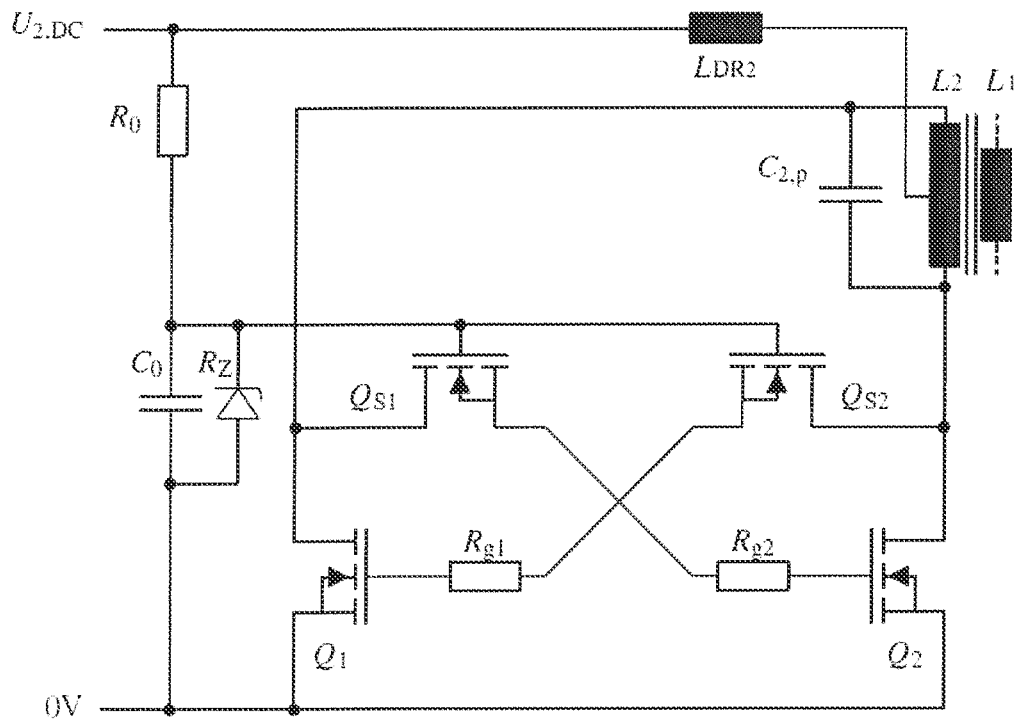
FIG. 1 shows an example of a circuit arrangement with active rectifier circuit in the form of a Royer converter according to the prior art.

An advantageous embodiment of the proposed circuit arrangement is based on a circuit known, for example, from DE 202007011745 U1. FIG. 1 shows this circuit of the prior art, which uses a so-called Royer converter. The Royer converter has two MOSFET power transistors $Q_1$, $Q_2$, which connect a side of the input inductor $L_2$ to a pole of the DC voltage terminal in a switchable manner. The two MOSFET power transistors $Q_1$, $Q_2$ are driven via two MOSFET control transistors $Q_{S1}$, $Q_{S2}$. For this purpose, the drain terminal of one of the control transistors is connected to the drain terminal of the first power transistor $Q_1$ and the source terminal of this control transistor $Q_{S1}$ is connected to the gate terminal of the second power transistor $Q_2$ via a resistor $R_{g2}$. The drain terminal of the other control transistor $Q_{S2}$ in turn is connected to the drain terminal of the second power transistor $Q_2$, and the source terminal is connected to the gate terminal of the first power transistor $Q_1$ via a resistor $R_{g1}$, as shown in FIG. 1. The voltage for the gates of the two control transistors $Q_{S1}$, $Q_{S2}$ is tapped at the DC link voltage $U_{2,DC}$ by means of a Zener diode $R_Z$ in this circuit. A centre tap on the input inductor $L_2$ is connected to the second pole of the DC voltage terminal via a choke $L_{DR2}$. The input inductor $L_2$ is compensated in parallel via the capacitor $C_{2,p}$ connected in parallel. The two poles of the DC voltage terminal are connected via a series circuit of a resistor $R_0$ and a parallel circuit of a capacitor $C_0$ and the Zener diode $R_Z$. In addition to operating as an inverter, this circuit can also be operated as an active rectifier. In both cases, the choke $L_{DR2}$ can be designed either as a component with a centre tap on the input inductor (coil $L_2$), as shown in FIG. 1, or in the form of two chokes without centre tap in the coil $L_2$.

When using this circuit as an inverter, it is necessary to first have a supply voltage present at the gates, such that the circuit can start to oscillate in an autoresonant manner. Otherwise, the control transistors $Q_{S1}$, $Q_{S2}$ are closed, such that the power transistors $Q_1$, $Q_2$ cannot transition into a conducting state. In the case of operation as rectifier, the diodes, which are not shown in FIG. 1 but are present in the power transistors $Q_1$ and $Q_2$, become active. This allows the circuit to first work passively as a rectifier before a DC link voltage is applied at output $U_{2,DC}$ a short time later, which in turn supplies the control transistors $Q_{S1}$ and $Q_{S2}$, such that the circuit now operates as an active rectifier. The time span until the circuit operates as an active rectifier lasts a few oscillations and is therefore tolerable by the passive components. However, as described above, only a very low output voltage $U_{2,DC}$ is present at the DC voltage terminal at a very high current, which output voltage is not sufficiently high at every operating point to reliably switch the gates. This is only possible with a design of the circuit arrangement according to the present invention.

Figure 2:
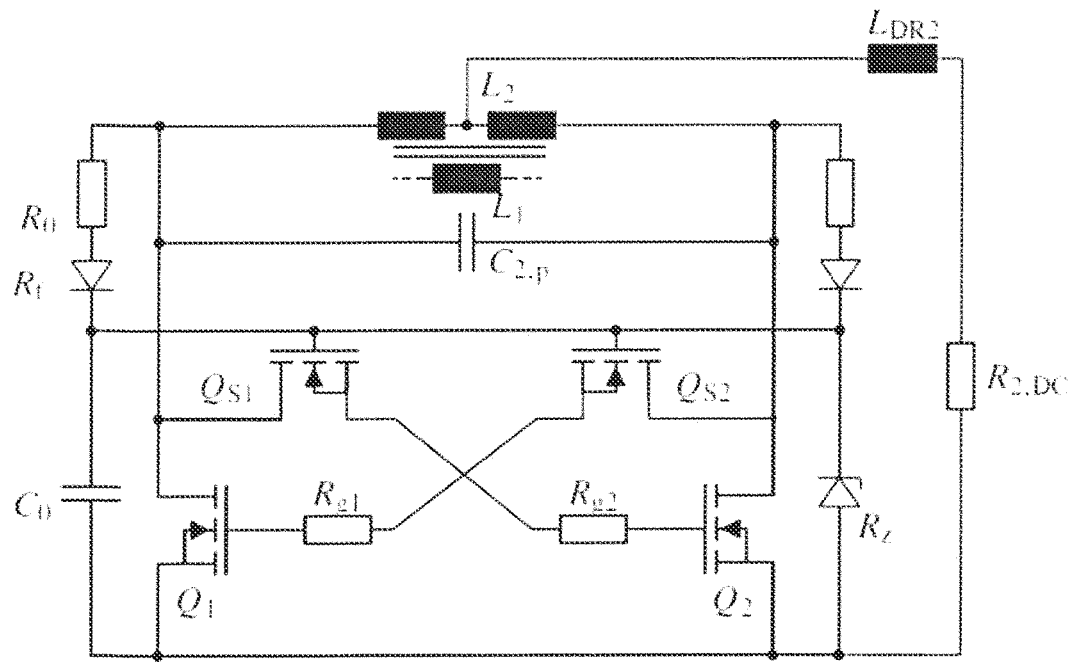
FIG. 2 shows a first example of a design of the proposed circuit arrangement.

In this context, FIG. 2 shows an example of the proposed circuit arrangement with an active rectifier circuit, which represents a modification of the circuit known from the prior art according to FIG. 1. The modification primarily concerns the generation of the supply voltage for switching the MOSFET power transistors $Q_1$, $Q_2$, which in the present patent application is also referred to as auxiliary voltage. In the proposed circuit arrangement, this voltage is generated via the resonant circuit consisting of the input inductor $L_2$ and the parallel capacitor $C_{2,p}$. The voltage in the resonant circuit at its peak value is a multiple of the DC link voltage, i.e. the voltage $U_{2,DC}$ at the output terminal of the active rectifier (voltage across $R_{2,DC}$). As virtually no energy is required for driving the gate, the peak value of the voltage in the resonant circuit can be used to switch the gates. In order not to cause any additional effects on the circuit, a balanced circuit was used on both sides of the capacitor or capacitance $C_{2,p}$ in the present examples. It is also possible to implement only one tap.

For the tap in the resonant circuit, an additional diode $R_f$ is required in addition to the resistor $R_0$, as the supply voltage of the control transistors $Q_{S1}$, $Q_{S2}$ can under no circumstances become lower than the gate threshold voltage of the control transistors $Q_{S1}$, $Q_{S2}$ when switching off $U_{2,DC}$ and before the end of the oscillation or during the negative half-waves of the resonant circuit voltage. On the other hand, due to the non-conductive state of the power transistors $Q_1$ and $Q_2$, the voltage increase in the input inductor $L_2$ would destroy at least one of the two transistors. The diode $R_f$ prevents this state by preventing the discharge of the capacitor $C_0$ parallel to the Zener diode when switching off the supply or output voltage $U_{2,DC}$.

Figure 3:
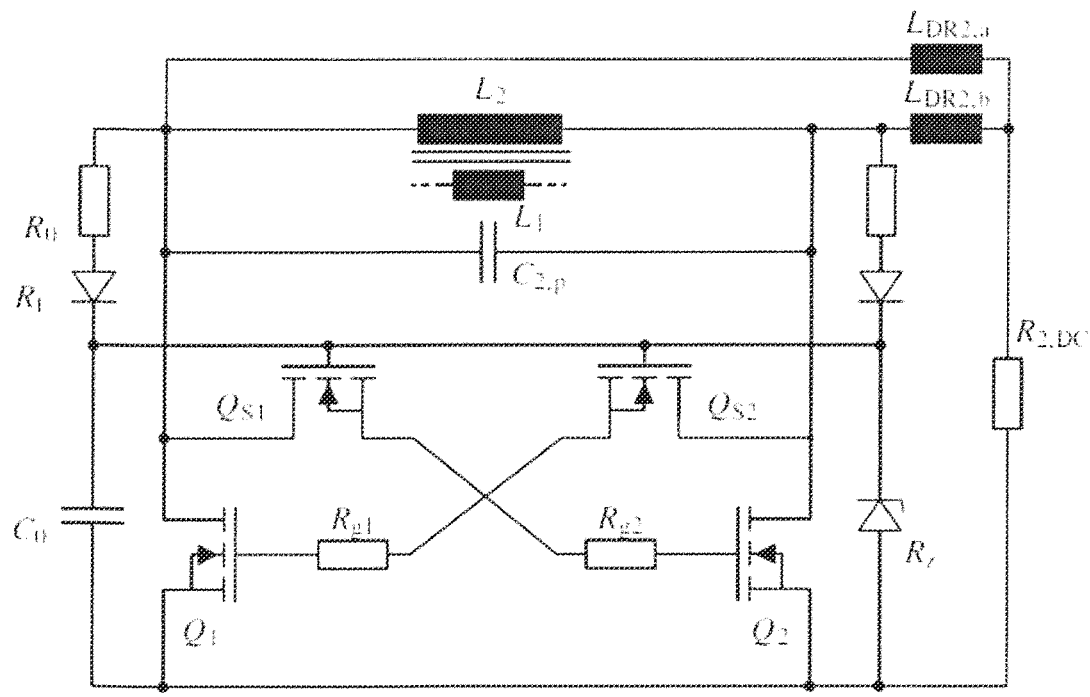
FIG. 3 shows a second example of a design of the proposed circuit arrangement.

FIG. 3 shows a modification of the proposed circuit arrangement shown in FIG. 2, in which no centre tap on the input inductor $L_2$ is performed, but in which the two sides of this inductor are connected to the second pole of the output terminal via two separate chokes $L_{DR2,a}$, $L_{DR2,b}$. When this circuit arrangement is used on the rotor of a synchronous machine, the rotor winding is formed by these two chokes. This is then a split rotor winding, e.g. for a multipolar machine. The series resistor of the rotor winding has been dispensed with; the resistances are shown here as the equivalent resistance $R_{2,DC}$. In the case of the example shown in FIG. 2, the choke $L_{DR2}$ only forms one rotor winding.

Figure 4:
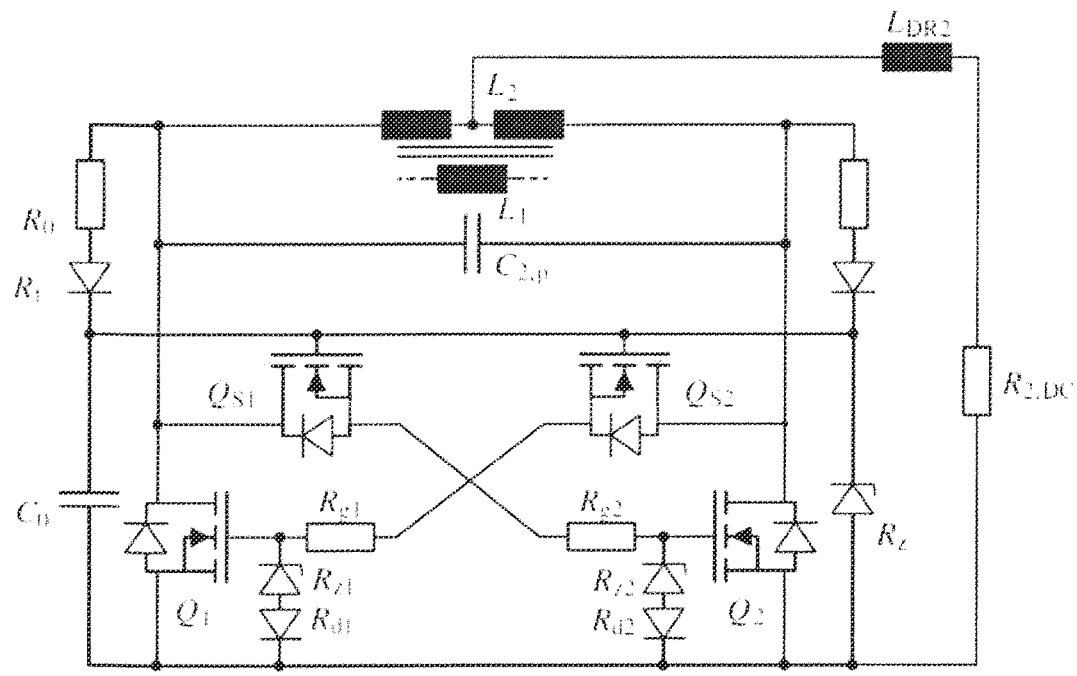
FIG. 4 shows another example of a design of the proposed circuit arrangement.

FIG. 4 shows another example of a design of the proposed circuit arrangement. In this example, in contrast to the embodiment shown in FIG. 2, the respective gates of the first and second power transistor $Q_1$, $Q_2$ are connected to the first pole of the output terminal via two opposing diodes. The two diodes are a Zener diode $R_{z1}$ or $R_{z2}$, which blocks the direction of the current from the gate to the first pole, on the one hand. The second diode $R_{d1}$ or $R_{d2}$ blocks the opposite direction of the current. A corresponding embodiment is of course also advantageous for the circuit arrangement shown in FIG. 3.

The two Zener diodes $R_{z1}$ or $R_{z2}$ are used to protect the respective gates from excessive voltage. It makes sense to install this Zener diode if the resonant circuit voltage is greater than that present at the control transistor $Q_{S1}$ as a gate voltage. In this case, the capacitance between drain and source at $Q_{S1}$, as well as the capacitance between gate and source at $Q_2$, forms a capacitive voltage divider. As a result, the permissible gate voltage may be exceeded. The Zener diode prevents this from happening. If the gates of the MOSFET control transistors $Q_{S1}$ and $Q_{S2}$ are not supplied with a constant voltage as usual, but are charged by the resonant circuit, it takes a certain time period of several oscillations until the gates of these control transistors are put into the conductive state by the resonant circuit. Within this time period, the body diode of the MOSFET power transistors is intended to conduct the current. However, in the absence of the diode $R_{d1}$ or $R_{d2}$, a further current flow is possible through the Zener diode and the body diode of the control transistor. In this case, a parallel circuit of two diodes is achieved. Power MOSFETs usually have very poor body diodes with high forward voltages, which is why it is possible that the current flows from the first pole via the Zener diode $R_{z2}$ and the body diode of the first control transistor $Q_{S1}$. In this case, the components are destroyed because they are not designed for this current. Due to the additional diode $R_{d1}$ or $R_{d2}$, this current flow is prevented. In practice, bidirectional Zener diodes can also be used, whereby the two diodes are embodied in one housing.

In principle, the active rectifier circuit of the proposed circuit arrangement can be realised not only as a half-bridge, as shown in FIG. 2 to 4, but also as a full bridge, which then means that only a voltage slightly higher than the output voltage of the active rectifier is available for switching the MOSFET power transistors. The proposed circuit arrangement can be used very advantageously in the secondary sides of inductive energy transmission paths, in particular when using such an energy transmission path between the stator and the rotor of a synchronous machine.

Figure 5:
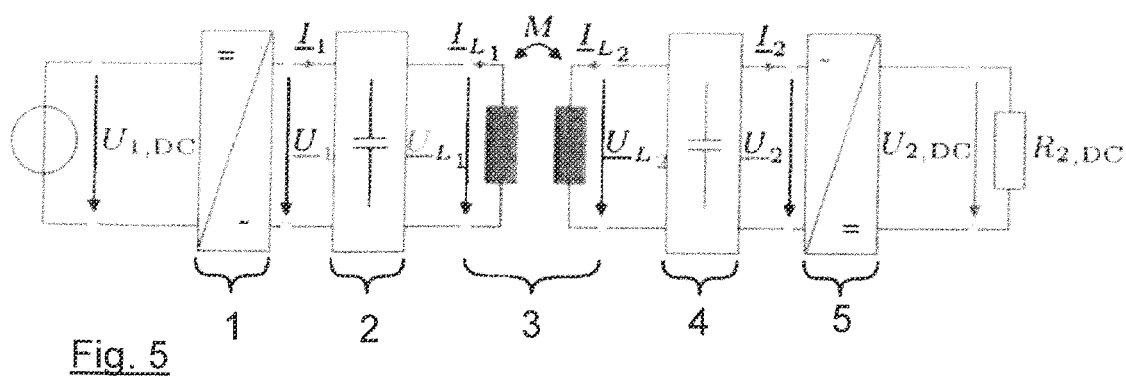
FIG. 5 shows an example of the design of an inductive energy transmission path in which the proposed circuit arrangement can be used.

FIG. 5 schematically shows an example of the design of an inductive energy transmission path. On the primary side, the input voltage $U_{1,DC}$ is converted into an AC voltage $\underline{U}_1$ via the inverter 1, which AC voltage is transmitted to the secondary side via the coil system 3 consisting of the primary coil $L_1$ and the secondary coil $L_2$. The primary coil $L_1$ and secondary coil $L_2$ have a parallel compensation 2, 4. The AC voltage $\underline{U}_2$ induced in the secondary coil $L_2$ is rectified via the rectifier 5 and is provided as the DC voltage $U_{2,DC}$. Therein, the proposed circuit arrangement with active rectifier circuit can replace the secondary coil $L_2$ as input impedance together with the parallel compensation 4 and the rectifier 5.

At low magnetic couplings between the two coils $L_1$, $L_2$, a low pass is created due to the LC resonant circuit. This means that almost no harmonics are present in the system. If only the fundamental wave is considered, sinusoidal currents and voltages exist in the system, depending on the compensation. Thus, so-called conversion factors or form factors for current and voltage result at the inverter and rectifier. The conversion factors are influenced by the design, i.e. whether a half or full bridge is used. If parallel compensation is used on the secondary side, the voltage factor for a full bridge is as follows:

$$U_{2,DC} = \frac{2 \cdot \sqrt{2}}{\pi} \cdot U_2$$

This means that the output or DC link voltage is about 0.9 times the resonant circuit voltage $U_2$. Correspondingly, the current acts inversely, such that the power remains constant in total. For a half-bridge, as shown in the examples of FIG. 2 to 4, this results in a factor of approximately 0.45 times. In addition, if the peak value is considered instead of the effective value, the formula is $$U_2 = \pi \cdot U_{2,DC}$$

This voltage increase in the resonant circuit is used by the proposed circuit arrangement to generate the gate voltage at the control transistors for switching the power transistors of the active rectifier circuit. Thus, even at higher currents and thus very low output voltage, a voltage value can be generated that is sufficiently high for switching the power transistors.

The proposed circuit arrangement having an active rectifier circuit is particularly advantageous at output voltages $U_{2,DC} < 20$ V. In this case, the voltage $U_{2,DC}$ across the resistor $R_{2,DC}$, e.g. the rotor resistance, is smaller than the nominal gate voltage of the MOSFET power transistors $Q_1$ and $Q_2$. Active switching is therefore no longer possible with the rectified voltage. Typical gate voltages of power MOSFETs are in the range of 10-20 V, wherein the contact resistance of the MOSFETs usually decreases steadily with increasing gate voltage. High losses usually occur below 10 V; the gate of a MOSFET usually cannot be exposed to voltages higher than 20 V without being damaged. The proposed active rectifier circuit can still offer advantages in the voltage range of 20 V≤$U_{2,DC}$<100 V, as lower output voltages are often present in the partial load range.

LIST OF REFERENCE SIGNS

1 Inverter
2 Parallel compensation
3 Coil system
4 Parallel compensation
5 Rectifier

The invention claimed is:

1. A circuit arrangement having an active rectifier circuit, in particular on the secondary side of an inductive energy transmission path, with a half or full bridge of first and second power transistors ($Q_1$, $Q_2$) for rectifying an AC voltage induced in an input inductor ($L_2$) of the circuit arrangement, and with a resonant circuit formed by a parallel circuit of the input inductor ($L_2$) and a first capacitor ($C_{2,p}$), characterized in that
the first and second power transistors ($Q_1$, $Q_2$) are connected to the input inductor ($L_2$) such that an auxiliary voltage for switching the power transistors ($Q_1$, $Q_2$) is split off from said resonant circuit, and wherein the first of said first and second power transistors ($Q_1$) establishes a switchable electrical connection between a first side of the input inductor ($L_2$) and a first pole of an output terminal,
the second of said first and second power transistors ($Q_2$) establishes a switchable electrical connection between a second side of the input inductor ($L_2$) and the first pole of the output terminal,
a drain terminal of a first control transistor ($Q_{S1}$) is connected to a drain terminal of the first power transistor ($Q_1$) and a source terminal of the first control transistor ($Q_{S1}$) is connected to a gate terminal of the second power transistor ($Q_2$),
a drain terminal of a second control transistor ($Q_{S2}$) is connected to a drain terminal of the second power transistor ($Q_2$) and a source terminal of the second control transistor ($Q_{S2}$) is connected to a gate terminal of the first power transistor ($Q_1$),
a centre tap of the input inductor ($L_2$) or both sides of the input inductor ($L_2$) of the resonant circuit is/are connected to a second pole of the output terminal via respective chokes ($L_{DR2}$), and
gate terminals of the first and second control transistors ($Q_{S1}$, $Q_{S2}$) are connected via a resistor ($R_0$) and a diode to both sides of the input inductance ($L_2$) of the resonant circuit via at least one resistor ($R_0$) and a diode ($R_f$) and connected to the first pole of the output terminal via a parallel circuit consisting of a second capacitor ($C_0$) and a Zener diode ($R_Z$).

2. The circuit arrangement according to claim 1, characterized in that
the control transistors ($Q_{S1}$, $Q_{S2}$) are MOSFETs.

3. The circuit arrangement according to claim 1, characterized in that
the power transistors ($Q_1$, $Q_2$) are MOSFETs.

4. A method for the use of the circuit arrangement according to claim 1 on a rotor of a synchronous machine, comprising:
performing an inductive energy transmission to the rotor via the input inductor ($L_2$) of the circuit arrangement.

5. A method for the use of the circuit arrangement according to claim 1 on a rotor of a synchronous machine, comprising:
performing an inductive energy transmission to the rotor via the input inductor ($L_2$) of the circuit arrangement, and forming the one or multiple chokes ($L_{DR2}$) by rotor windings of the rotor.

6. A rotor of a synchronous machine comprising the circuit arrangement according to claim 1, wherein an inductive energy transmission to the rotor is performed via the input inductor ($L_2$) of the circuit arrangement.

7. A rotor of a synchronous machine comprising the circuit arrangement of claim 1, wherein an inductive energy transmission to the rotor is performed via the input inductor ($L_2$) of the circuit arrangement, and wherein one or multiple chokes ($L_{DR2}$) are formed by rotor windings of the rotor.

8. A circuit arrangement having an active rectifier circuit, in particular on the secondary side of an inductive energy transmission path, with a half or full bridge of first and second power transistors ($Q_1$, $Q_2$) for rectifying an AC voltage induced in an input inductor ($L_2$) of the circuit arrangement, and with a resonant circuit formed by a parallel circuit of the input inductor ($L_2$) and a first capacitor ($C_{2,p}$), characterized in that
the first and second power transistors ($Q_1$, $Q_2$) are connected to the input inductor (L2) such that an auxiliary voltage for switching the power transistors ($Q_1$, $Q_2$) is split off from said resonant circuit, and wherein the first of said first and second power transistors ($Q_1$) establishes a switchable electrical connection between a first side of the input inductor ($L_2$) and a first pole of an output terminal,
the second of said first and second power transistors ($Q_2$) establishes a switchable electrical connection between a second side of the input inductor ($L_2$) and the first pole of the output terminal,
a drain terminal of a first control transistor ($Q_{S1}$) is connected to a drain terminal of the first power transistor ($Q_1$) and a source terminal of the first control transistor ($Q_{S1}$) is connected to a gate terminal of the second power transistor ($Q_2$),
a drain terminal of a second control transistor ($Q_{S2}$) is connected to a drain terminal of the second power transistor ($Q_2$) and a source terminal of the second control transistor ($Q_{S2}$) is connected to a gate terminal of the first power transistor ($Q_1$),
a centre tap of the input inductor ($L_2$) or both sides of the input inductor ($L_2$) of the resonant circuit is/are connected to a second pole of the output terminal via respective chokes ($L_{DR2}$), and
wherein gate terminals of the first and second power transistors ($Q_1$, $Q_2$) in each case are connected to the first pole of the output terminal either via a series circuit of another Zener diode ($R_{z1}$, $R_{z2}$) and another diode ($R_{d1}$, $R_{d2}$) or via a bidirectional Zener diode, wherein the further Zener diode ($R_{z1}$, $R_{z2}$) prevents a current from flowing from the gate terminal of the respective power transistors ($Q_1$, $Q_2$) to the first pole until the Zener voltage is reached, and the further diode ($R_{d1}$, $R_{d2}$) prevents a current flowing from the first pole to the gate terminal of the respective power transistors ($Q_1$, $Q_2$).

9. The circuit arrangement according to claim 8, characterized in that the control transistors ($Q_{S1}$, $Q_{S2}$) are MOSFETs.

10. The circuit arrangement according to claim 8, characterized in that the power transistors (Q1, Q2) are MOSFETs.

11. A method for the use of the circuit arrangement according to claim 8 on a rotor of a synchronous machine, comprising:
performing an inductive energy transmission to the rotor via the input inductor (L2) of the circuit arrangement.

12. A method for the use of the circuit arrangement according to claim 8 on a rotor of a synchronous machine, comprising:
performing an inductive energy transmission to the rotor via the input inductor (L2) of the circuit arrangement, and forming the one or multiple chokes (LDR2) by rotor windings of the rotor.

13. A rotor of a synchronous machine comprising the circuit arrangement according to claim 8, wherein an inductive energy transmission to the rotor is performed via the input inductor (L2) of the circuit arrangement.

14. A rotor of a synchronous machine comprising the circuit arrangement of claim 8, wherein an inductive energy transmission to the rotor is performed via the input inductor (L2) of the circuit arrangement, and wherein one or multiple chokes (LDR2) are formed by rotor windings of the rotor.

* * * * *